Sept. 21, 1965    W. M. NELSON    3,206,980
SOLID STATE ALTIMETER
Filed Oct. 29, 1962
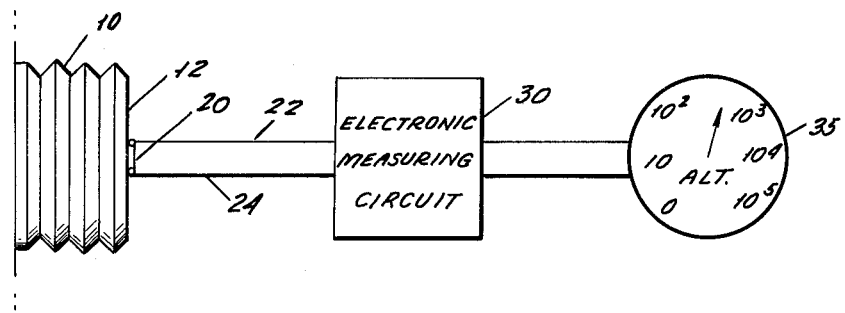
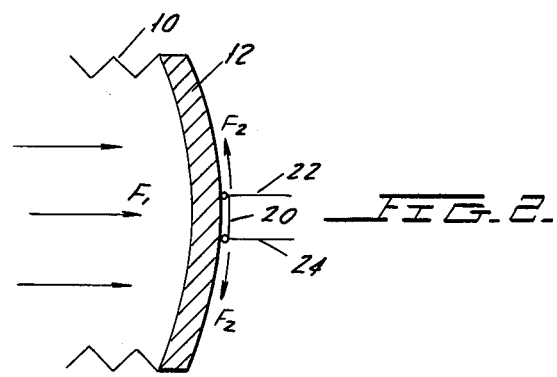
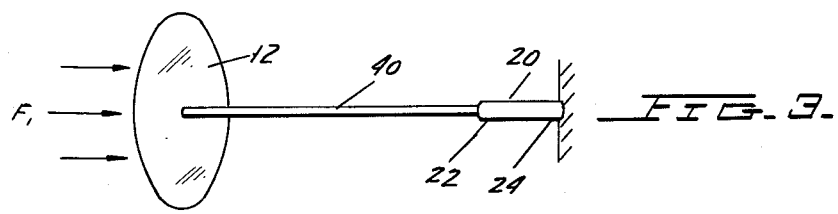
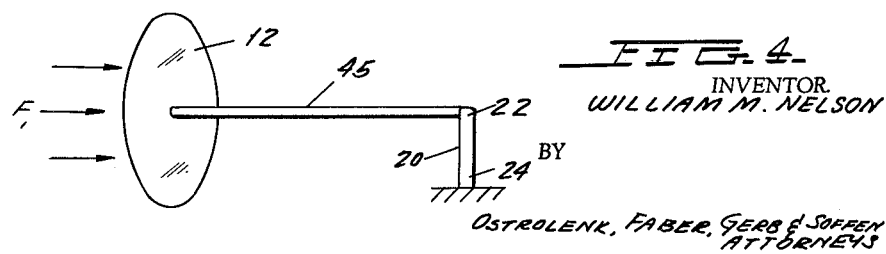
INVENTOR.
WILLIAM M. NELSON
BY
OSTROLENK, FABER, GERB & SOFFEN
ATTORNEYS 3,206,980
SOLID STATE ALTIMETER
William M. Nelson, Flushing, N.Y., assignor to Kollsman Instrument Corporation, Elmhurst, N.Y., a corporation of New York
Filed Oct. 29, 1962, Ser. No. 233,824
6 Claims. (Cl. 73—386)

This invention relates to an aircraft altimeter, and more particularly to an altimeter using a piezoresistive transducer to provide improved operation characteristics.

It is known in the aircraft instrumentation art to measure altitude by providing an instrument including a pressure sensitive device such as an aneroid cell. When subjected to changes in altitude, the cell diaphragm will expand or contract an amount proportional to the attendant atmospheric change. The movement of the diaphragm is then typically interconnected to a visual display pointer as by mechanical linkages to thereby provide an indication responsive to altitude. Such altimeters are, however, limited as to range, accuracy, response time and linearity, thereby restricting their utility for many applications.

My invention provides an improved altimeter structure yielding preferable operating characteristics over the heretofore known device. Basically my invention provides an altimeter wherein the aneroid cell diaphragm is mechanically connected in a simplified manner to an appropriate transducer such as a piezoresistive silicon fiber. The piezoresistive transducer fiber has an appropriate doping level and crystallographic orientation, such that it will have a high ratio of resistance change to dimensional change. The diaphragm can be connected to the piezoresistive transducer through an external linkage to place it in compression or bending stress, or the fiber can be directly bonded to the diaphrgam to be subjected to varying compression stresses as the diaphragm expands and contracts. An electrical circuit connected, for example, in series with the piezoresistive transducer, will then measure its resistance which is directly responsive to the force within the diaphragm created due to changes in altitude. The change in fiber resistance as a result of its subjected-to stresses permits a direct instantaneous electrical read-out which is a function of altitude.

In one illustrative embodiment of my invention the silicon fiber transducer is directly connected to the aneroid cell diaphragm by a simple linkage such that movement of the diaphragm places the fiber in compressive strain. In an alternative embodiment the mechanical linkage between the diaphragm and the piezoresistive fiber is such that a bending stress is created in the fiber proportional to the movement of diaphragm. These embodiments though suitable for many applications do have certain limitations. The fiber in these embodiments is unsupported. Because of the typical small size of such fibers (typically $10^{-5}$ centimeter square cross-section), difficulties ensue in avoiding the tendency of the fiber to buckle under the subjected forces. Although this may be partially overcome by pre-stressing the fiber, such an altimeter will not be sufficiently shock insensitive for many applications. Also the fiber is exposed to the ambient surroundings. Because of the chemical activity of silicon, it is necessary to coat the fiber to prevent interaction with the air, or alternatively the inside of the altimeter must be evacuated. The coating of the unsupported fiber will have a mechanical effect on the transducer displacement. As another limitation, the mechanical linkage between the fiber and the diaphragm should be infinitely rigid in order to accurately translate the true deflection of the diaphragm to the fiber. Any deviations from such a theoretically desirable coupling effects the precision of the resultant indication.

A preferred illustrative embodiment of my invention avoids the limitations discussed above by directly bonding the fiber transducer in the center portion of the aneroid cell diaphragm. Although it is still necessary to protect the fiber from the air, in this case the coating need not have large mechanical effects since the fiber is completely supported by its bonding to the diaphragm. Also, the altimeter constructed in this manner is significantly more compact than the other arrangements. As a further advantage of this embodiment the fiber will measure stresses within the diaphragm walls themselves, rather than the movement of the diaphragm. The stress forces exerted by the diaphragm wall are much larger than the displacement forces and therefore provide a more sensitive instrument. The fiber is preferably of significantly smaller dimensions than the diaphragm wall, to thereby have a negligible effect upon the pressure responsive stresses of the diaphragm wall.

As a further aspect of my invention the range and sensitivity of the instrument may be varied by proper control of the doping level of the piezoresistive transducer fiber, or by modifying the radius and thickness of the diaphragm wall. The entire unit may be compactly assembled within a unitary housing having a two prong electrical connector corresponding to the terminal outputs of the piezoresistive transducer.

It is therefore seen that the basic concept of my invention resides in the use of a piezoresistive transducer means operatively connected in a preferred manner to a pressure responsive aneroid cell. The variable resistive output of the transducer is connected to an appropriate electronic circuit having a meter output calibrated in magnitudes of altitude to thereby provide a direct electrical indication of altitude.

It is therefore a primary object of this invention to provide a solid state altimeter having increased sensitivity and accuracy.

A further object of this invention is to provide an aircraft altimeter wherein a pressure responsive member is mechanically connected to a piezoresistive transducer to generate a resistive output signal operatively related to altitude.

An additional object of this invention is to provide such an aircraft altimeter wherein the piezoresistive transducer is a small fiber bonded to the central portion of an aneroid cell diaphragm.

Still another object of this invention is to provide such a solid state aircraft altimeter wherein the piezoresistive fiber is dimensioned substantially smaller than that of the diaphragm to which it is bonded such that the presence of the transducer will only have a negligible effect on the pressure responsive forces produced in the diaphragm.

These as well as other objects of the invention will readily become apparent from the following description and accompanying drawings in which:

FIGURE 1 is a simplified schematic view of a preferred altimeter embodiment constructed in accordance with the basic concept of my invention.

FIGURE 2 is a cross-sectional view which shows the transducer element bonded to the diaphragm surface.

FIGURE 3 schematically shows another embodiment of my invention wherein a mechanical linkage between the diaphragm and the piezoresistive transducer fiber places the fiber in compressive stress.

FIGURE 4 is a similar schematic view of another embodiment of my invention wherein a direct mechanical linkage between the diaphragm and the piezoresistive transducer fiber creates a bending stress in the transducer.

Referring to the figures, aneroid cell 10 is constructed in the conventional manner to expand and contract in accordance with variations in atmospheric pressure. The diaphragm 12 of aneroid cell 10 is appropriately designed to be subjected to a distorting force proportionally related to the presure response of aneroid cell 10. In accordance with the teachings of my invention the pressure response of diaphragm 12 is translated to piezoresistive fiber 20 which is mechanically interconnected to diaphragm 12.

In the preferred embodiment shown in FIGURES 1 and 2, fiber 20 is directly bonded to the central region of diaphragm 12 so as to be subjected to straining forces F2, proportional to the stresses set up in the diaphragm wall responsive to contraction or expansion of the aneroid cell. Semiconductor fiber 20 is appropriately constructed to have a large ratio of resistive change to dimensional change. Typically, element 20 may be a silicon piezoresistive fiber appropriately processed by controlling doping levels and crystallographic orientation to have characteristics desirable for the particular application, with strain guage factors of 80 being feasible. Also, the dimensions of fiber 20 are appreciably less than that of diaphragm 12 such that it will have a negligible effect upon the forces created in the diaphragm. Under such conditions I have observed that the wall stress forces F2 serve to apply a longitudinal tension to the fiber 20 which proportionally varies its resistance. The terminal leads 22, 24 of the transducer element 20 are included in a conventional electronic measuring circuit, preferably in series with piezoresistive transducer 20, such that the differential drop in voltage caused by the piezoresistive change is linearly related to the pressure responsive force $f2$ within the diaphragm walls 12. The signal produced by the resistive change in transducer 20 may then be appropriately calibrated to provide a visual indication 35 of the altitude. As for example, for a full scale deflection reading of $10^5$ dyne centimeter$^2$ (about 0.1 of an atmosphere) approximately a half volt differential can be obtained with a 10 volt excitation voltage. Thus, to sub-divide the scale into one-hundred parts, the electronic circuitry need only be sensitive to five millivolts, well within the capabilities of commercially available devices. The range of the altimeter may be extended by decreasing the sensitivity. This may be accomplished by decreasing the radius and increasing the thickness of the diaphragm. Conversely, to make a more sensitive (but more limited) device, the radius is increased and the diaphragm thickness decreased.

FIGURES 3 and 4 illustrate other embodiments of my invention wherein the diaphragm element 12 of the aneroid cell is interconnected by mechanical linkages 40, 45 respectively to transducer fiber 20. Although suitable for many applications, these embodiments exhibit limitations avoided by the above-discussed preferred embodiment of FIGURES 1 and 2. The fiber 20 which is of extremely small dimensions is unsupported and therefore creates practical problems in providing a mounting means that will avoid the tendency of fiber 20 to buckle under the translated forces from diaphragm 12. Also, since fiber 20 is exposed, it is subjected to chemical activity of the silicon and must therefore be coated to prevent inter-reaction, or the inside of the altimeter housing must be evacuated. Further, extreme accuracy of the device requires that linkage rods 40 and 45 be infinitely rigid. Any deviation from this requirement affects the accuracy of the piezoresistive changes responsive to the movement of diaphragm 12 and complicates the analysis of the system. Further, since the embodiment of FIGURES 1 and 2 is responsive to the distorting forces $f2$ created within the diaphragm walls themselves, substantially more sensitivity is provided than in the embodiment of FIGURES 3 and 4, which are responsive to the stress shown by $f1$.

It is, therefore, seen that my invention permits a sensitive and accurate solid state altimeter which provides a direct electrical readout of altitude. Numerous embodiments are illustrated with their applications being dictated by the requirements of a particular system. Since many variations and modifications will now become apparent to those skilled in the art, I prefer, therefore, not to be limited to the specific disclosure contained herein but only by the appended claims.

I claim:
1. An altimeter for aircraft comprising in combination a partially evacuted bellows adapted to expand and contract in response to changes in atmospheric pressure, and a piezo-resistive fiber constructed to effect a variation in electrical resistance in accordance with the mechanical stresses induced therein; said bellows including a diaphragm end wall distortively strained responsive to said pressure induced changes; said piezo-resistive fiber means directly bonded to said diaphragm to provide a resistive response accurately related to said pressure induced changes; said piezoresistive fiber dimensionally related to said diaphragm to provide a negligible loading effect on the pressure responsive distortive straining of said diaphragm, whereby the stresses induced in said piezo-resistive fiber are accurately responsive to changes in atmospheric pressure; conductor means connected to said piezo-resistive fiber to provide a resistive output signal responsive to the stresses developed therein, for accurately indicating altitude.

2. The altimeter of claim 1, wherein said diaphragm is of generally circular configuration; said piezo-resistive fiber being bonded to the centermost region of said diaphragm and having a length substantially less than the diameter of said diaphragm.

3. The altimeter of claim 1, wherein said piezo-resistive fiber has a cross-sectional area substantially less than the thickness of said diaphragm.

4. An altimeter for aircraft comprising a generally cylindrical aneroid cell; said aneroid cell having a diaphragm end wall of predetermined diameter and thickness; the peripheral regions of said diaphragm end wall being secured against movement, whereby the pressure induced movement of said aneroid cell creates distortive straining forces concentrated within the central region of said diaphragm end wall; a piezo-resistive semi-conductor fiber bonded along the length thereof to said diaphragm central region; said piezo-resistive semi-conductor fiber constructed to exhibit an appreciable variation of electrical resistance with stress; the pressure induced distortive movement of said diaphragm wall directly translated to said piezo-resistive semi-conductor fiber bonded thereto, whereby the resistance of said piezo-resistive semi-conductor fiber is varied responsive to pressure variation; conductor means connected to said piezo-resistive fiber to provide a resistive output signal indicating altitude; said piezo-resistive fiber dimensionally related to the diameter and thickness of said diaphragm to be accurately responsive to said pressure induced movement while having a substantially negligible loading effect on the magnitude of said movement.

5. The altimeter of claim 4, wherein said piezo-resistive fiber is substantially shorter than said diaphrgam diameter, is completely confined to the central region of said diaphragm, and has a substantially lesser cross-sectional area than said diaphragm thickness.

6. The altimeter of claim 4, wherein the range and sensitivity of altimeter response are modifiable by variations in said thickness and diameter of said pressure responsive diaphragm.

References Cited by the Examiner

UNITED STATES PATENTS

| | | | |
|---|---|---|---|
| 2,563,405 | 8/51 | Germaix | 73—387 X |
| 2,648,828 | 8/53 | Teichmann | 73—398 |
| 3,031,634 | 4/62 | Vogt | 73—88.5 |
| 3,049,685 | 8/62 | Wright | 73—88.5 |
| 3,079,576 | 2/63 | Kooiman | 73—88.5 |

RICHARD C. QUEISSER, *Primary Examiner.*